(12) United States Patent
Patterson et al.

(10) Patent No.: US 9,723,783 B2
(45) Date of Patent: Aug. 8, 2017

(54) FOLDING AUGER ASSEMBLY COUPLER

(71) Applicant: CNH Industrial America LLC, New Holland, PA (US)

(72) Inventors: Chase Patterson, Etters, PA (US); Cooper W. Linde, Lancaster, PA (US); Kevin Ward, Lititz, PA (US); William M. McCully, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/403,887

(22) PCT Filed: May 23, 2013

(86) PCT No.: PCT/US2013/042469
§ 371 (c)(1),
(2) Date: Nov. 25, 2014

(87) PCT Pub. No.: WO2013/181067
PCT Pub. Date: Dec. 5, 2013

(65) Prior Publication Data
US 2015/0296709 A1 Oct. 22, 2015

Related U.S. Application Data

(60) Provisional application No. 61/689,069, filed on May 29, 2012.

(51) Int. Cl.
*B65G 33/32* (2006.01)
*A01D 41/12* (2006.01)
*A01D 61/00* (2006.01)
*B65G 67/24* (2006.01)
*F16D 1/10* (2006.01)

(52) U.S. Cl.
CPC ....... *A01D 41/1217* (2013.01); *A01D 61/008* (2013.01); *B65G 33/32* (2013.01); *B65G 67/24* (2013.01); *F16D 1/101* (2013.01); *B65G 2201/042* (2013.01); *B65G 2814/0326* (2013.01); *F16D 2001/103* (2013.01)

(58) Field of Classification Search
CPC ..... B65G 33/32; A01D 41/127; A01D 61/008
USPC ......................................... 198/666, 667, 668
See application file for complete search history.

(56) References Cited

U.S. PATENT DOCUMENTS 2,138,576 A * 11/1938 Gebert .................. B65G 33/32
198/666
3,550,793 A * 12/1970 Garner ............... A01D 41/1217
198/632

(Continued)

*Primary Examiner* — William R Harp
(74) *Attorney, Agent, or Firm* — Patrick M. Sheldrake

(57) ABSTRACT

An agricultural combine including an agricultural harvester, a crop tank for harvested material, and an unloading auger assembly for unloading and discharging crop material. The auger assembly has inner and outer auger tubes pivotally connected to one another. The auger tubes pivot between a first position in which the auger tubes extend transversely and are coaxial and a second position in which the auger tubes form an angle. The auger tubes contain augers having first and second couplings at cooperating ends. The first coupling has two projections extending to cooperate with a single radial projection on the second coupling to provide improved engagement.

14 Claims, 3 Drawing Sheets

(56) References Cited

U.S. PATENT DOCUMENTS

| | | | | |
|---|---|---|---|---|
| 3,560,133 A | * | 2/1971 | Ryczek | A01D 41/1217 198/582 |
| 3,638,816 A | * | 2/1972 | Mann | B65G 41/002 414/504 |
| 3,719,268 A | * | 3/1973 | Koehnen | B65G 33/00 198/632 |
| 3,938,684 A | | 2/1976 | Quoiffy et al. | |
| 4,071,105 A | | 1/1978 | von Allworden | |
| 4,353,851 A | | 10/1982 | Godfrey et al. | |
| 4,368,003 A | * | 1/1983 | MacDonald | A01B 73/065 111/57 |
| 4,530,429 A | | 7/1985 | Erickson | |
| 4,621,968 A | * | 11/1986 | Hutchison | B65G 65/466 198/666 |
| 5,100,281 A | * | 3/1992 | Grieshop | B60P 1/40 414/519 |
| 5,129,502 A | | 7/1992 | Justice | |
| 5,183,147 A | * | 2/1993 | Callahan | B65G 65/46 198/524 |
| 5,673,543 A | | 10/1997 | Richardson et al. | |
| 6,186,655 B1 | | 2/2001 | Brookes et al. | |
| 6,341,481 B1 | | 1/2002 | van der Merwe | |
| 6,422,376 B1 | | 7/2002 | Nichols et al. | |
| 6,712,691 B2 | | 3/2004 | McLeod | |
| 6,908,380 B2 | | 6/2005 | Silver | |
| 6,966,506 B2 | | 11/2005 | McLeod et al. | |
| 7,367,881 B2 | * | 5/2008 | Voss | A01D 41/1217 414/526 |
| 7,393,275 B2 | | 7/2008 | Voss et al. | |
| 7,494,409 B2 | * | 2/2009 | Voss | A01D 41/1217 460/114 |
| 8,033,377 B2 | | 10/2011 | Reimer et al. | |
| 8,037,667 B2 | | 10/2011 | Eagles et al. | |
| 8,827,782 B2 | * | 9/2014 | Dise | A01F 12/46 460/114 |
| 2007/0137408 A1 | | 6/2007 | Lassiter | |
| 2007/0172338 A1 | | 7/2007 | Reimer et al. | |
| 2011/0174224 A1 | | 7/2011 | Brooks | |

* cited by examiner

FOLDING AUGER ASSEMBLY COUPLER

This application is the U.S. National Stage filing of International Application Serial No. PCT/US2013/042469 filed on May 23, 2013 which claims priority to US Provisional Application No. 61/689,069 filed May 29, 2012, each of which is incorporated herein by reference in its entirety.

BACKGROUND OF THE INVENTION

1. Field of the Invention

The present invention relates to agricultural harvesters such as combines, and, more particularly, to auger assemblies used in such combines.

2. Description of the Related Art

An agricultural harvester known as a "combine" is historically termed as such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Typical unloading systems for combines involve unloading augers that are formed from inner and outer tubes (relative to the chassis of the combine) with rotatable augers inside that can be actuated to move grain longitudinally through the tubes. The tubes are pivoted to the combine so that they may be displaced laterally relative to the movement of the combine to an unload position in which grain is deposited in a wagon or other vehicle for transport. When the unloading function is completed, the auger tubes are retracted to a fold position in which the inner auger tube is generally parallel to the longitudinal axis of the combine and the outer auger tube is bent to an angle in a horizontal plane so that its free end is maintained within the overall configuration of the combine.

The auger tubes each have longitudinally extending augers within them that are mounted for rotation so that crop material is moved longitudinally through the augers. Because the auger tubes are pivoted between the unload and fold position, it is necessary to provide a mechanical coupler between the drive auger in the inner auger tube and the driven auger in the outer auger tube that delivers crop material to a transport vehicle. In the past, the coupling between the two augers has been provided by single projections at the end of each auger that interact and abut to cause the outer auger to be driven. With prior auger designs, the initial coupling of the auger tubes in the driving position causes, under certain circumstances, a movement of the projection into place and subsequent rotational displacement that can be close to a complete circle. The rotational displacement causes an opportunity for accelerated impact between the two projections, thus having an effect on long term wear.

Accordingly, what is needed in the art is an auger coupling mechanism that minimizes acceleration forces upon engagement.

SUMMARY OF THE INVENTION

The present invention provides an auger coupling mechanism for auger tube assemblies that reduces engagement forces.

The invention in one form is an unloading auger tube assembly for an agricultural harvester having first and second tubes, each having a longitudinal axis and pivotally connected to one another. First and second augers are positioned longitudinally in the tubes for rotating to move crop material longitudinally upon rotation of the augers. First and second couplers selectively couple the first and second augers when the auger tubes are pivoted to be coaxial with the first coupler including at least two projections extending toward the second coupler with the second coupler having a single projection for interacting with one of said at least two projections.

The invention in another form is an agricultural combine with an agricultural harvester in a crop tank for harvested material. An unloading auger is provided for unloading and discharging crop material with the auger assembly including inner and outer auger tubes, each having a longitudinal axis and pivotally connected to one another with the auger tubes pivotal between a first position in which the auger tubes are coaxial and a second position in which the auger tubes form an angle. Inner and outer augers are positioned longitudinally in the inner and outer tubes respectively for rotation to move crop material longitudinally upon rotation of the augers. First and second couplers selectively couple the inner and outer augers respectively when the auger tubes are pivoted to be coaxial. The first coupler includes at least two projections extending toward the second coupler with the second coupler having a single projection for interacting with one of the at least two projections.

An advantage of the present invention is that the coupling is designed to increase coupling life.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The term "grain" is used principally throughout this specification for convenience but it is to be understood that this term is not intended to be limiting. Thus "grain" refers to that part of the crop material which is threshed and separated from the discardable part of the crop material. Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
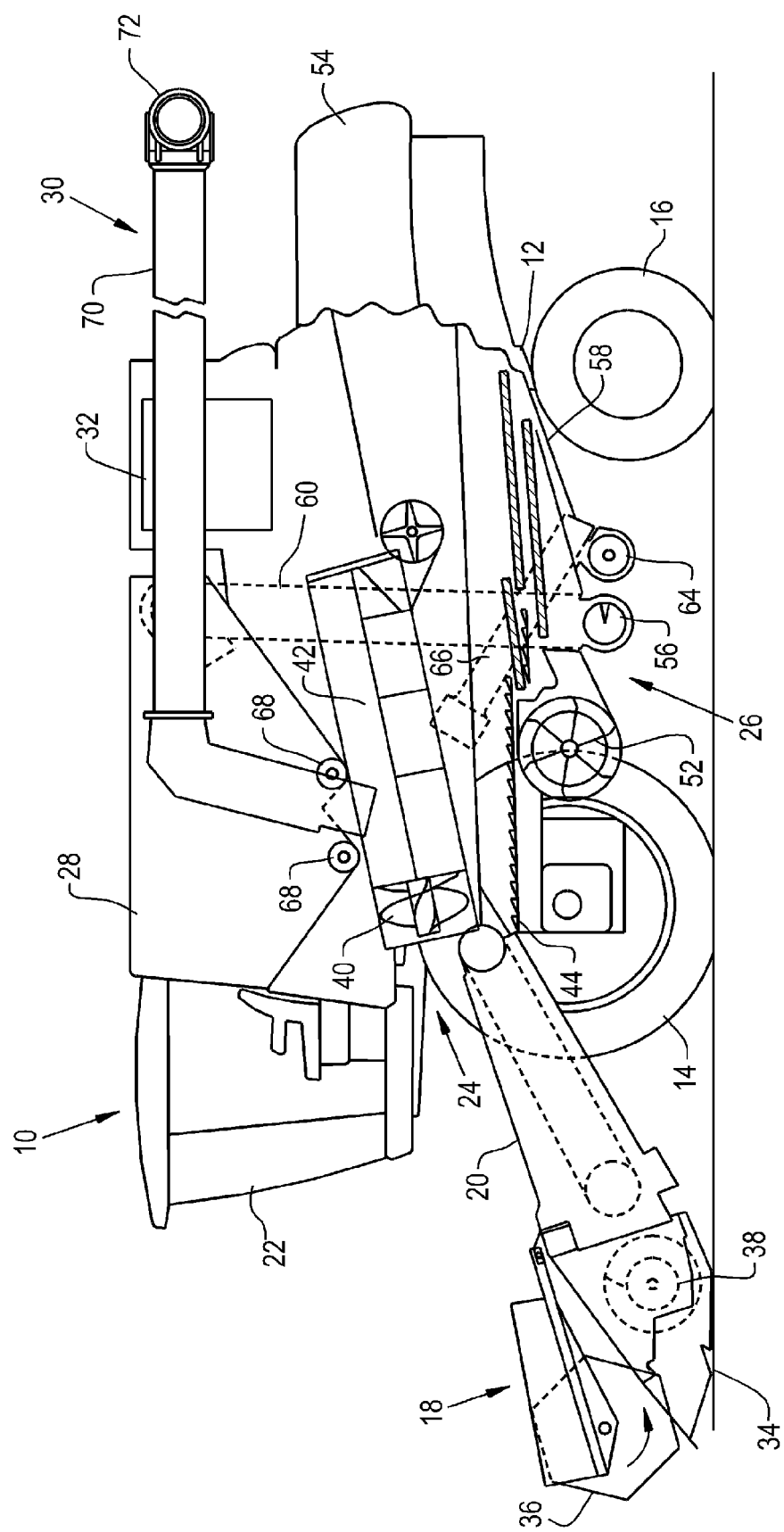
FIG. 1 is a side view of an embodiment of an agricultural harvester in the form of a combine which may include a folding auger assembly coupler of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger assembly 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is s selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26 including sieves 46, 48 and 50. Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. A pair of grain tank augers 68 at the bottom of grain tank 28 conveys the clean grain laterally within grain tank 28 to unloading auger assembly 30 for discharge from combine 10.

Figure 2:
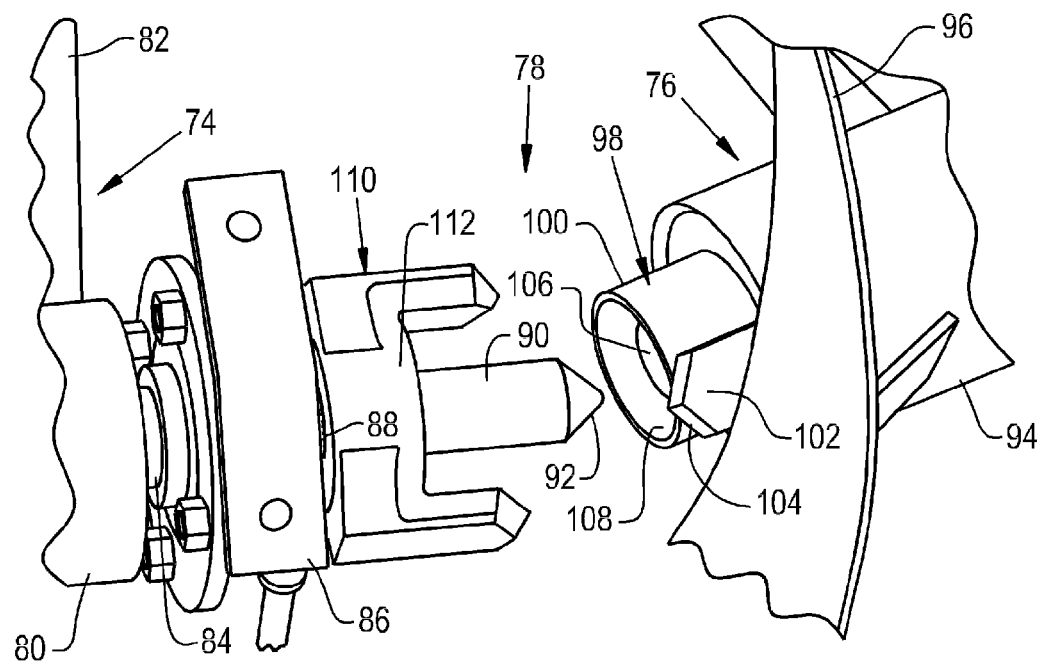
FIG. 2 is a fragmentary enlarged view of the agricultural harvester of FIG. 1 showing the folding auger assembly in a first position.
Figure 3:
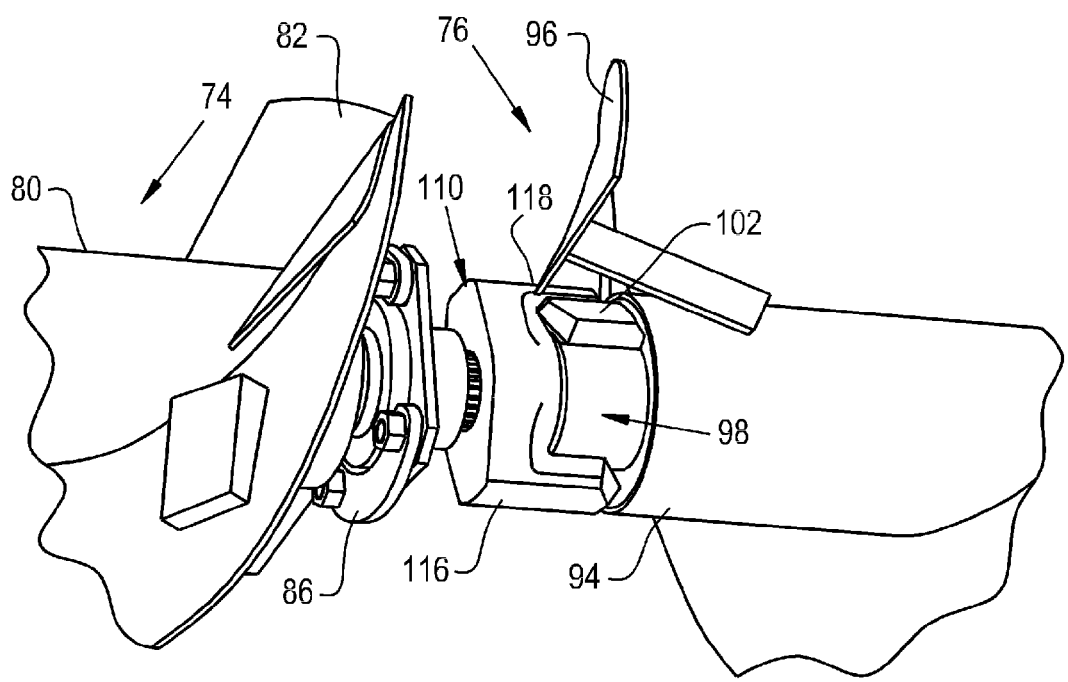
FIG. 3 is a fragmentary enlarged view of the agricultural harvester of FIG. 1 showing the folding auger assembly in a second position.

Referring to FIGS. 1, 2 and 3, unloading auger assembly 30 is formed from a first (or inner) auger tube 70 pivotally connected to combine 10 to receive grain from grain tank 28. Auger tube 70 has a longitudinally extending auger 74. A second (or outer) auger tube 72 has an auger 76, both shown in FIG. 2 to convey crop material along the axis of tubes 70 and 72. Auger tube 70 is pivotally connected to second auger tube 72 by an appropriate pivotal interconnection (not shown). The arrangement of first and second auger tubes 70 and 72 in FIG. 1 shows the auger assembly 30 in a position in between the load position and the fold position in which first auger tube 70 extends along side the combine 10 and second auger tube 72 is folded to be maintained within the width of the combine 10. As shown in FIG. 1, the angle made between the first and second auger tubes 70 and 72 is 95°, but other angles may be employed.

The auger tubes 70, 72 are in the fold position, except when crop material is being discharged, in which case the auger tubes 70 and 72 are pivoted to be coaxial in the load position for discharging grain and the auger assembly is pivoted to a position generally laterally from the combine 10.

Figure 4:
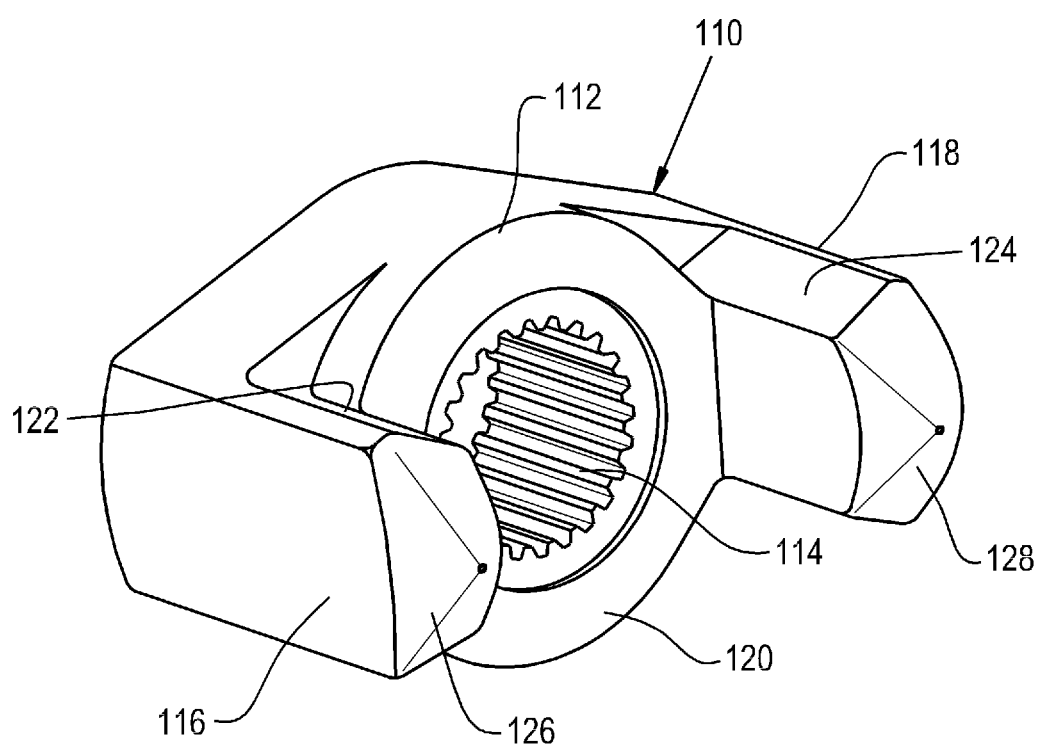
FIG. 4 is a greatly enlarged perspective view of one of the components of FIGS. 2 and 3.

In accordance with the present invention, an improved coupler assembly 78 shown in FIGS. 2-4 reduces the engagement loads when the auger tubes 70 and 72 are pivoted to coaxial or load position. Specifically referring to FIGS. 2 and 3, a first (or inner) auger 74 includes a central tubular element 80 having attached thereto flighting 82 which is helical in form and has the effect of moving crop material along the axis of tubular element 80 when it is rotated. Tubular element 80 has an end shaft 84 retained within a bearing assembly 86 fixed to the walls of tube 70. End shaft 84 has a splined section 88 and leading to a nose section 90 with a conical end portion 92.

A first coupling 110, as illustrated, is formed from a unitary material and includes a central section 112 having internal splines 114, shown in FIG. 4 to be received over splines 88 on end shaft 84. Coupling 110 also has axially extending first and second projections 116 and 118 extending beyond the axial end face 120 of coupling 110. First and second projections 118 have side faces 122 and 124 respectively that are each formed in a plane extending through the central axis of shaft 84 so that they are essentially a radially extending surface. Projections 116 and 118 have tapered nose sections 126 and 128, herein shown as conical shapes. It should be noted however that the end faces 126 and 128 may also have a wedge shape.

A second (or outer) auger 76 includes a central tubular element 94 with flighting 96 similarly attached so that crop material moves axially upon rotation of tubular element 94. Auger 76 has a second coupling 98 including a cylindrical outer section 100 having a radial projection 102 with a tapered nose section 104. Second coupling 98 also has a central bore 106 extending to a tapered end section 108.

The position of the augers 74 and 76 in FIG. 2 is a position between the fold position of FIG. 1 and the unload position of FIG. 3 in which the augers 74 and 76 are coaxial. As the augers 74 and 76 are displaced to be engaged, the conical end piece on end shaft 90 cooperates with the tapered section 108 on second coupling 98 to form a pilot for auger tube 76 and to cause auger 76 to be supported for rotation by bearing assembly 86 that supports auger 74. As the augers 74 and 76 are displaced to the position of FIG. 3, the projections 116 and 118 on the first coupling 110 move over the outer cylindrical surface 100 of coupling 98 to a point where the axial end face 120 of coupling 110 abuts the end face of second coupling 98. In this position, shown specifically in FIGS. 3, the rotation of auger 74 causes the projections 116 and 118 to rotate so that one of the two projections abuts the side face of single projection 102. It is to be noted that the tapered end sections 126 and 28 on first coupling 110 and the tapered section 104 on single projection 102 of second coupling 98 allow the projections and single projections to be moved to the side for engagement when the elements are lined up. When the projections 116 or 118 abut the single projection 102 the auger 76 then is driven by auger 74.

By providing at least two projections 116 and 118, the arc for free movement before engagement of single projection 102 by projections 116 or 118 is reduced by about half. Accordingly, the opportunity for acceleration of the projections before impact is reduced significantly, thus increasing longevity. It has been found that the alignment of the flighting 82 and 96 can either be in a position in which it is aligned or the other position in which it is 180 degrees out of phase. Experimentation has shown that this does not significantly affect flow of grain material through the auger assembly. Furthermore, an additional number of projections may be provided to further reduce free movement upon initial engagement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An unloading tubular auger assembly for an agricultural harvester, said auger assembly comprising first and second tubes each having a longitudinal axis and pivotally connected to one another;
   first and second augers positioned longitudinally in said tubes for rotating to move crop material longitudinally upon rotation of said augers;
   first and second couplers configured for selectively coupling said first and second augers in a conveying orientation when said auger tubes are pivoted to be coaxial, said first coupler comprising a first coupler base and at least two projections extending toward a second coupler base when in the conveying orientation, said second coupler comprising the second coupler base, a cylindrical surface with a single projection for interacting with one of said at least two projections of the first coupler, wherein said at least two projections of the first coupler extend axially beyond the first coupler base and along the cylindrical surface of said second coupler when the couplers are engaged in the conveying orientation; and said single projection of said second coupler has a tip that tapers to a point facing said first coupler.

2. The auger assembly of claim 1, wherein said first and second augers comprise central tubes and helical flighting attached thereto.

3. The auger assembly of claim 2, wherein said first coupler is splined to a shaft connected to said first auger central tube.

4. The auger assembly of claim 3 further comprising a bearing assembly for journaling said shaft within said first auger tube and wherein:
   said shaft has a conical end; and,
   said second coupler has an end bore and a tapered end section so that the end of said shaft cooperates with said tapered end section to pilot said second auger when said augers are pivoted to be coaxial.

5. An unloading tubular auger assembly for an agricultural harvester, said auger assembly comprising first and second tubes each having a longitudinal axis and pivotally connected to one another;
   first and second augers positioned longitudinally in said tubes for rotating to move crop material longitudinally upon rotation of said augers;
   first and second couplers selectively configured for coupling said first and second augers in a conveying orientation when said auger tubes are pivoted to be coaxial, said first coupler comprising a first coupler base and at least two projections extending toward a second coupler base when in a conveying orientation, said second coupler comprising the second coupler base, a cylindrical surface with a single projection for interacting with one of said at least two projections of the first coupler, wherein said said at least two projections of the first coupler extend axially beyond the first coupler base and along the circumferential surface of said second coupler when the couplers are engaged in the conveying orientation;
   wherein said at least two projections of the first coupler comprise tips that taper to a point.

6. The auger assembly of claim 5, wherein said tips are conical.

7. The auger assembly of claim 6, wherein the at least two projections have side faces in a plane extending through the longitudinal axis of said tubes.

8. An agricultural combine comprising;
   an agricultural harvester;
   a crop tank for harvested material;
      an unloading auger assembly for unloading and discharging crop material, said auger assembly comprising;
      inner and outer tubes each having a longitudinal axis and pivotally connected to one another;
      inner and outer augers positioned longitudinally in said inner and outer tubes, respectively for rotating to move crop material longitudinally upon rotation of said augers;
      first and second couplers for selectively coupling said inner and outer augers respectively when said auger tubes are pivoted to be coaxial, said first coupler comprising at least two projections extending from a first coupler base toward a second coupler base when in a coupled position, said second coupler comprising the second coupler base, a cylindrical surface with a single projection for interacting with one of said at least two projections of said first coupler, wherein said at least two projections extend axially beyond the first coupler base and along the cylindrical surface of said second coupler and wherein said single projection of the second coupler comprises a tip that tapers to a point facing said first coupler base when in a conveying position .

9. The agricultural combine of claim 8, wherein said at least two projections extending from said first coupler base comprise tips that taper to a point.

10. The agricultural combine of claim 9, wherein said tips are conical.

11. The agricultural combine of claim 10, wherein the said at least two projections further comprise side faces in a plane extending through the longitudinal axis of said tubes.

12. The agricultural combine of claim 8, wherein said inner and outer augers comprise central tubes and helical flighting attached thereto.

13. The agricultural combine of claim 12, wherein said first coupler is splined to a shaft connected to said inner auger central tube.

14. The agricultural combine of claim 13 further comprising a bearing assembly for journaling said shaft within said inner auger tube and wherein:
- said shaft has a conical end; and,
- said second coupler has an end bore and a tapered end section so that the end of said shaft cooperates with said tapered end section to pilot said second auger when said inner and outer augers are pivoted to be coaxial.

* * * * *